United States Patent [19]

Glaser

[11] 3,793,167

[45] Feb. 19, 1974

[54] APPARATUS FOR MANUFACTURING METAL-COATED GLASS

[75] Inventor: John H. Glaser, Abington, Pa.

[73] Assignee: Globe-Amerada Glass Co., Elk Grove Village, Ill.

[22] Filed: June 1, 1972

[21] Appl. No.: 258,874

[52] U.S. Cl.............. 204/298, 118/49.1, 161/196, 204/192
[51] Int. Cl............................................ C23c 15/00
[58] Field of Search........................... 204/192, 298

[56] References Cited
UNITED STATES PATENTS
3,294,670  12/1966  Charschan et al.................. 204/192

Primary Examiner—John H. Mack
Assistant Examiner—Wayne A. Langel
Attorney, Agent, or Firm—Irwin C. Alter

[57] ABSTRACT

Glass sheets are conveyed through a vacuum tunnel oven. The glass sheets are heated and outgassed, decontaminated, metal coated, and overcoated to protect the metal finish. The metal and refractory coatings are applied by an electromagnetic sputtering deposition in which the material is deposited at a controlled rate with particle impact upon a glass substrate at a very high velocity and a high voltage. Optical sensors monitor the process and activate the movement of the glass sheets as they reach the desired state of preparation at each station.

9 Claims, 3 Drawing Figures

APPARATUS FOR MANUFACTURING METAL-COATED GLASS

This invention relates to a process and apparatus for the manufacture of semi-transparent glass and, more particularly, to dichroic windows having metallic coatings.

Radiant energy may be transmitted in the form of ultraviolet rays, visible rays, and infrared rays. This spectrum extends over the range from approximately 1,000 to 2,000,000 angstroms wavelength. To modify the radiant energy transmission characteristics of glass, a thin and transparent metal coating may be added to form a semi-transparent or dichroic mirror which reflects selected regions of the spectrum. If the heat causing parts of the spectrum are so reflected, the window becomes an efficient thermal barrier.

To achieve the desired results, various processes have been developed in the past to deposit metal, metal alloys, and dielectric layers onto transparent substrates by chemical, evaporation, electron-beam deposition, and by vapor, spraying, and pyrolyzing processes of enameling and thermal decomposition of organometal compounds. The products resulting from these processes were expensive and difficult to manufacture to close tolerance. They lacked uniform quality, were not free of defects, and did not have long life stability. They were subject to mechanical damage and corrosion.

Accordingly, an object of the invention is to provide new and improved semi-transparent glass. Here, an object is to provide new processes whereby the glass may be made in a more efficient, less cumbersome, and lower cost manner. In particular, an object is to coat glass and other transparent materials with molecular bonding vapors and with a protected surface. In this connection, an object is to protect against all contaminates which tend to corrode, discolor, or disfigure the mirror surface.

Another object of the invention is to provide new and novel methods of surfacing semi-transparent glass. Here an object is to provide a technique for so surfacing glass by a metal sputtering process. More specifically, an object is to enable the depositing of metal coating having virtually any suitable thickness or color.

A further object of the invention is to provide new and novel apparatus for accomplishing the foregoing objects. In general, an object is to provide an apparatus having a process for sequentially manufacturing a plurality of sheets of semi-transparent glass. Another object is to provide such a system which is adapted to process batch loads of such glass sheets and is also adaptable to a continuous processing, if that should be desirable.

In keeping with an aspect of the invention, these and other objects are accomplished by providing a multi-station conveyor belt housed within a large cabinet which is vacuum pumped. Glass sheets are conveyed through the cabinet to be processed. At the successive stations, they are heated and outgassed, decontaminated, metal coated, and surfaced. Optical and sonic sensors monitor the process and move the glass sheets as they reach the desired state of preparation. The new process of manufacturing this glass enables the production of a combination surface with desired properties. The process uses an electromagnetic sputtering deposition in which the material is deposited at a controlled rate and impacted at very high velocity and at a high voltage upon a glass substrate. A uniform coating is formed by clusters of macromolecules deposited in and upon the substrate until they form a uniform metallic film. The deposited coating is securely bonded and molecularly interlocked into the glass material. Thereafter, it is suitably protected against abrasion, chemical, and mechanical damage by an overcoating of transparent material.

The term "sputtering" is used herein to describe a known phenomenon wherein a high frequency electrical field bombards a surface with ions which disintegrate or erode the bombarded surface. The ion is accelerated to a high velocity to cause a transfer of momentum energy.

The nature of the preferred process and apparatus for carrying out the process will be understood best from a study of the attached drawings wherein.

Figure 1:
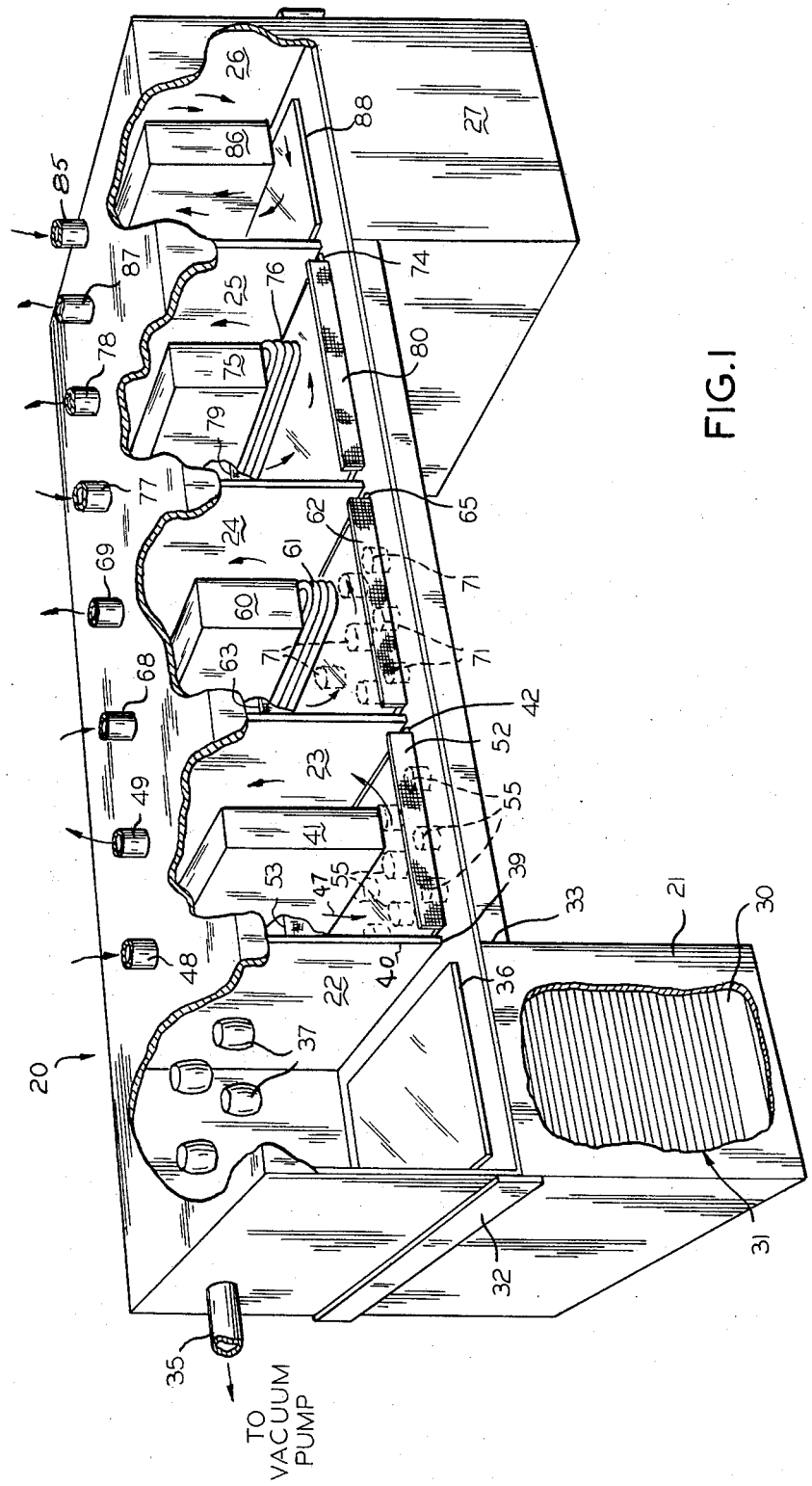
FIG. 1 is a partly cut away perspective view of apparatus for practicing the invention.

The structure of FIG. 1 includes a multi-station production line housed in a vacuum oven 20. The stations include an input cassette 21, a heat and outgas chamber 22, a cleaning station 23, a sputtering station 24, an overcoating station 25, a cleaning station 26, and an output cassette 27.

The input cassette 21 is any suitable housing having therein an elevator device 30 for supporting and raising a stack of glass sheets which are to be processed. The device may have differential characteristics whereby the uppermost glass sheet is always flush with the top of the cassette regardless of the loading.

One or more cassettes are preloaded with a plurality of suitable blanks 31, such as glass sheets and then brought to the housing 20. Each glass sheet is cleaned, dried, inspected, and placed in a holding frame. Then the cassette is closed to provide a sealed chamber which can support a vacuum. A pair of guide rails 32, 33 and are on the sides of the apparatus to provide means for attaching the cassette to the apparatus 20. After the cassette is attached, a vacuum pump, connected to exhaust part 35, draws a vacuum throughout the cabinet 20, and the entire cabinet 20 is exhausted.

Means are provided for heating and outgassing the blanks, here glass sheets, to be processed, before they are transported through the production line. More particularly, regardless of how the glass sheets are raised, the uppermost sheet 36 is positioned inside the heating chamber 22 where its temperature is raised by the heat from one or more heat lamps 37 or other devices. The heat also penetrates the top two or three sheets of glass to preheat them before their input into the production line. Thus, the glass sheets leaving the chamber 22 are heated to a predetermined temperature, and they are free of entrapped gas or moisture.

Means are provided for cleaning out the ions and other foreign materials lodged in the interstices of the molecular lattice structure in the upper layer of the glass. More specifically, any suitable conveyor means transports the heated and outgassed panel 36 from station 22 to station 23 by sliding it under the bottom 39 of an interstage separator bulkhead 40. The conveyor could be chains gripping the edges of the glass, or a glass holder, or pusher bar mechanism.

Figure 2:
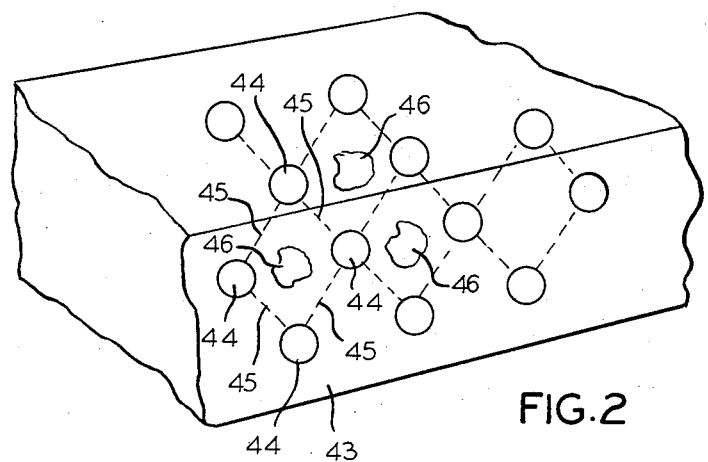
FIG. 2 is a highly stylized representation of the lattice structure of a glass substrate.

In station 23, a source of electrons, at 41, bombards the surface of the glass sheet 42 to displace ions, especially hydroxyl and alkali ions, from the surface. More particularly, as symbolically shown in FIG. 2, glass 43 is made from a lattice of atoms 44 bound together by electrons 45, thereby leaving interstices 46, which may be filled with ions. The electrons displace the ions out of the interstices 46, and a blast of oxygen and a noble gas 47 is pumped in at an input port 48, fed across the glass surface, and sucked out at an exhaust port 49. The center baffle 41 directs the blast to sweep across the surface of the glass sheet 42. The blast strikes the surface which is to be coated and carries away the dislodged ions. A pair of parallel, metallic screens 52, 53, are held at ground potential to carry away the electrons. The glass sheet 42 is thus cleaned to a depth of about 50 angstroms. Loosely bonded foreign substances are displaced out of the interstices; however, special care is taken to remove the hydroxyl and alkali ions since they are the primary elements which corrode or discolor the metallic surface and prevent adequate bonding.

Means are provided for coating the surface of the glass sheet with a semi-transparent layer. In greater detail, a center baffle 60 has an RF coil 61 suspended therefrom. Material forming a source of sputtered metal is positioned near the coil to be attacked by the resulting electrical field. Any suitable material may be used; however, preferred copper-alloys are aluminum-gold, chrome-gold, and nickel-iron-cobalt. As the metal is attacked by the RF energy, it disintegrates and particles of macromolecule size rain down upon the cleaned surface of glass sheet 65. The molecular bonding is strong enough to preserve the alloy composition within the macromolecular particles as they travel through space to the sheet of glass. The two ground screens 62, 63, collect particles falling outside the desired area. The particles which fall on the glass are diffused in the first 50 angstroms 64 (FIG. 3) of the cleaned interstices 46 (FIG. 2) to form a molecular bond into the lattice of the glass 65. Once the bonding begins, the raining particles cause an epitaxial growth in the metal coating layer.

During sputtering, a noble gas is pumped into inlet 68, around baffle 60 and out of the outlet 69. The baffle 60 helps the gas to sweep across the surface of the glass 65. In one exemplary system, actually built and tested, argon was used. This gas enables the particle penetration of the lattice and the locking into the lattice structure. The color of light transmitted through the glass changes as the layer becomes thicker. At the extremely thin film stage, the transmitted light is fairly uniform across the spectrum. As the layer of metal film 66 gets thicker, there is an initial blue-green color in the vicinity of 5,700 angstroms, where the eye is the most sensitive. Then, with increasing thickness, the color of the film goes through gray and copper, finally moving off toward the blue end of the scale.

To monitor the process, a number of photoelectric cells 71 are uniformly distributed underneath the glass. In between the glass 65 and the photocells 71 is a dichroic filter having light passing characteristics which are complimentary to the light transmission characteristics desired for the glass sheet 65. The design of such a filter is within the skill of the art. The invention contemplates a filter made from a sheet of glass which is coated with an alloy of copper and aluminum. In any event, the photoelectric cells cease to receive a detectable amount of light when the metallic film 66 reaches a thickness wherein its band pass characteristics complement the characteristics of the light filter. By surface compression and bridging of fine fissures, the metallic coating makes the glass stronger than an equivalent but undercoated glass sheet.

Figure 3:
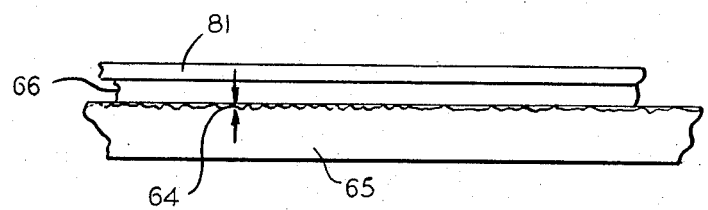
FIG. 3 is a cross-sectional view of a laminate constructed according to the teachings of the invention.

Means are provided for applying a protective surface over the metallic coating on the glass. More particularly, when the metallic film reaches the desired thickness, the sheet of glass is moved into the area of station 25, as indicated at 74. Here, there is a baffle member 75 for supporting an RF coil 76 and for diverting and directing a flow of oxygen pumped into an inlet port 77, over the surface of glass 74, and out an exhaust port 78. The ground screens 79, 80 collect any sputtered material falling outside the area of the glass 74. A material which will sputter is placed in the RF field to provide macromolecular sized particles which will deposit upon the metal coating surface. I prefer to use a refractory oxyd material with matched alpha as the transparent coating 81 (FIG. 3). However, other materials which may also be used are aluminum oxide, spinels, silicates, titanium oxides, magnesium aluminum iron silicate and oxide, various glasses, and other substances having a proper refractory index of hardness. One consideration for selection of the overcoating material is the diffusion of the reflected light. This coating 81 provides a good mechanical shield for the metallic coating 66.

FIG. 1 does not show any sensors for monitoring the coating applied in station 25 as coating thickness will be controlled by the time cycle. The time required to sputter a metal coating 66 in station 24 is the time required to sputter a protective coating 81 at station 25 by suitable adjustment of voltage and frequency. Therefore, the two glass sheets 65, 74 move simultaneously. However, sensors similar to 55, 71 may be provided, as desired.

The glass next moves to station 26 where a dry gas is pumped into an intake port 85, around a baffle 86, across the surface of the glass sheet 88, and out an exhaust port 87. Here, the glass is cooled and returned to ambient environmental conditions.

As each new glass sheet is fed into station 26, the preceding glass sheet 88 is lowered into the cassette 27. After the last glass sheet has been moved from cassette 21 to cassette 27, the vacuum is released at 35. The cassette 27 is removed for unloading. A loaded cassette of blanks replaces the spent cassette 21, and an empty cassette 27 is placed at the output end of the cabinet 20. Thereafter, a new batch is processed.

The advantages of the invention should now be clear. The system enables close production controls. The vacuum throughout the cabinet 20 eliminates gate leaks and external influences from the process stations. Although the system is here shown as a batch process using loaded cassettes, there is a high productivity as compared to competitive systems. Variability in sizes and alternative specifications of glass sheets are easily obtained. Computer controls may be added to provide reliability and great economy. Each sputtering station may be individually controllable. It can be serviced, and electrodes may be replaced. Special gases may be supplied at precise feeding rate and pressure to closely control internal flow of processing within the system.

The various time cycle requirements for preparation of the substrates are eliminated by always having available a ready loaded cassette.

The inventive process is also suitable for coating aircraft windows, providing electrically heated films for defrosting and defogging car windows. Transparent plastics may be coated. Thermal control window panels may be made for ovens, freezers and low and high temperature cabinets. Radiation panels may be made for public transportation systems, public passageways, bank windows, and security systems.

Still other advantages, uses and products will readily occur to those who are skilled in the art. Therefore, the appended claims are to be construed to cover all equivalents falling within the true scope and spirit of the invention.

I claim:

1. Apparatus for coating blank panels comprising a plurality of cassettes for storing said blanks, one of said cassettes being filled with said blanks prior to processing and another of said cassettes receiving blanks after they have been processed, means for conveying said blanks from said one cassette to said other cassette, and means for sputtering a film on the surface of said blanks during said conveyance.

2. The apparatus of claim 1 and means for bombarding with electrons said blanks prior to sputtering for cleaning said blanks from ions lodged in the intermolecular interstices of the lattice forming the structure of the blank and reactive oxygen network.

3. The apparatus of claim 2 and means for detecting the cleaning of said interstices of said blank to a predetermined depth, and means responsive to said detection for moving said blank to said sputtering means where said film is deposited on said blank with molecular bonding into said interstices.

4. The apparatus of claim 3 and sputtering means for overcoating said film with a transparent mechanically protecting layer.

5. The apparatus of claim 4 wherein said sputtering means for overcoating is suitable for applying a transparent layer of a refractory oxide.

6. The apparatus of claim 4 wherein said sputtering means for overcoating is suitable for applying a transparent layer taken from the class of materials including aluminum oxide, spinels, silicates, titanium oxides, and magnesium aluminum iron silicate and oxide.

7. The apparatus of claim 1 and a vacuum-tight housing having a plurality of stations separated by bulkheads having lower edges under which said blanks move as they are conveyed from station to station.

8. The apparatus of claim 7 and baffle means in each of said stations, and means for pumping controlled amounts of gas around said baffle to sweep across the surface of said blanks.

9. The apparatus of claim 7 and light filter means having light transmission characteristics complementary to the desired light transmission characteristics of said blanks, and photoelectric sensors positioned on one side of said filter aligned with said blank to detect when light from the other side of said blank is obscured by the complementary characteristics of said glass and said filter.

* * * * *